United States Patent
Yang et al.

(10) Patent No.: US 11,270,397 B2
(45) Date of Patent: Mar. 8, 2022

(54) AUTOMATIC URBAN LAND IDENTIFICATION SYSTEM INTEGRATING BUSINESS BIG DATA WITH BUILDING FORM

(71) Applicant: SOUTHEAST UNIVERSITY, Nanjing (CN)

(72) Inventors: Junyan Yang, Nanjing (CN); Dian Shao, Nanjing (CN); Qiao Wang, Nanjing (CN); Zhicheng Liu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 119 days.

(21) Appl. No.: 16/963,506

(22) PCT Filed: Jan. 14, 2020

(86) PCT No.: PCT/CN2020/071915
§ 371 (c)(1),
(2) Date: Jul. 21, 2020

(87) PCT Pub. No.: WO2020/151528
PCT Pub. Date: Jul. 30, 2020

(65) Prior Publication Data
US 2021/0217117 A1     Jul. 15, 2021

(30) Foreign Application Priority Data
Jan. 25, 2019   (CN) .......................... 201910072439.8

(51) Int. Cl.
*G06Q 50/26*   (2012.01)
*G06N 20/00*   (2019.01)
*G06K 9/62*    (2022.01)

(52) U.S. Cl.
CPC ............. *G06Q 50/26* (2013.01); *G06K 9/628* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2007/0162372 A1* | 7/2007 | Anas | G06Q 40/00 705/35 |
| 2009/0234782 A1* | 9/2009 | Apte | G06N 20/00 706/12 |
| 2019/0066137 A1* | 2/2019 | Weissbourd | G06Q 30/0205 |

FOREIGN PATENT DOCUMENTS

| | | | |
|---|---|---|---|
| AU | 2019101466 A4 * | 1/2020 | ............. G06Q 10/04 |
| CN | 102521273 B | 6/2013 | |

(Continued)

OTHER PUBLICATIONS

Ayad et al. "Predicting the future urban growth and it's impacts on the surrounding environment using urban simulation models: Case study of Ibb city—Yemen," Alexandria Engineering Journal, vol. 57, Issue 4, 2018, pp. 2887-2895, https://www.sciencedirect.com/science/article/pii/S1110016818300863 (Year: 2018).*

(Continued)

*Primary Examiner* — Patricia H Munson
*Assistant Examiner* — Nancy N Prasad
(74) *Attorney, Agent, or Firm* — Bayramoglu Law Offices LLC

(57) ABSTRACT

An automatic urban land identification system integrating business big data with building forms, including a data acquiring and inputting module, a database construction module, a machine learning training module, an automatic identification module, and a data outputting module. The system automatically identifies an urban land by extracting a data distribution feature of an urban business site and a (Continued)

multi-dimensional form feature of an urban spatial three-dimensional entity. The system can be used for the determining of land usage of an urban plot in the field of urban planning and design, to achieve efficient and automatic refined identification of land usages of cities of different scales based on an artificial intelligence system, providing an efficient and convenient surveying and mapping approach and reference for surveying and mapping of the current urban construction land, and effectively saving time costs of manual surveying and mapping.

10 Claims, 4 Drawing Sheets

(56) References Cited

FOREIGN PATENT DOCUMENTS

| | | |
|---|---|---|
| CN | 105893544 A | 8/2016 |
| CN | 105912764 A | 8/2016 |
| CN | 106897417 A | 6/2017 |
| CN | 107679229 A | 2/2018 |
| CN | 108052887 A | 5/2018 |
| CN | 109816581 A | 5/2019 |

OTHER PUBLICATIONS

Ke Tian et al., Innovation breakthrough! Method and practice of urban land function recognition based on big data & machine learning, Jul. 23, 2017.

Junyan Yang, Theoretical Consturction and Practical Exploration of Urban Spatial Form Partition, City Planing Review, 2017, pp. 41-51, vol. 41, No. 3.

GB50137-2011, National standard: Code for classification of urban land use and planning standards of development land, Jan. 1, 2012, Ministry of Housing and Urban rural Development of the people's Republic of China.

* cited by examiner

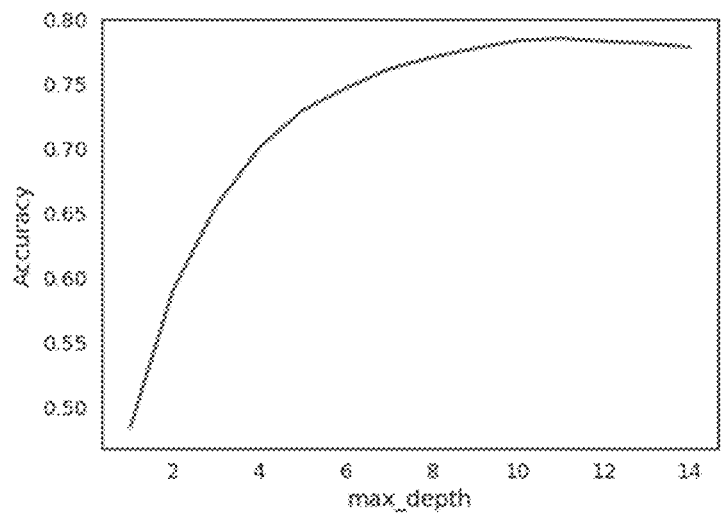
FIG. 4
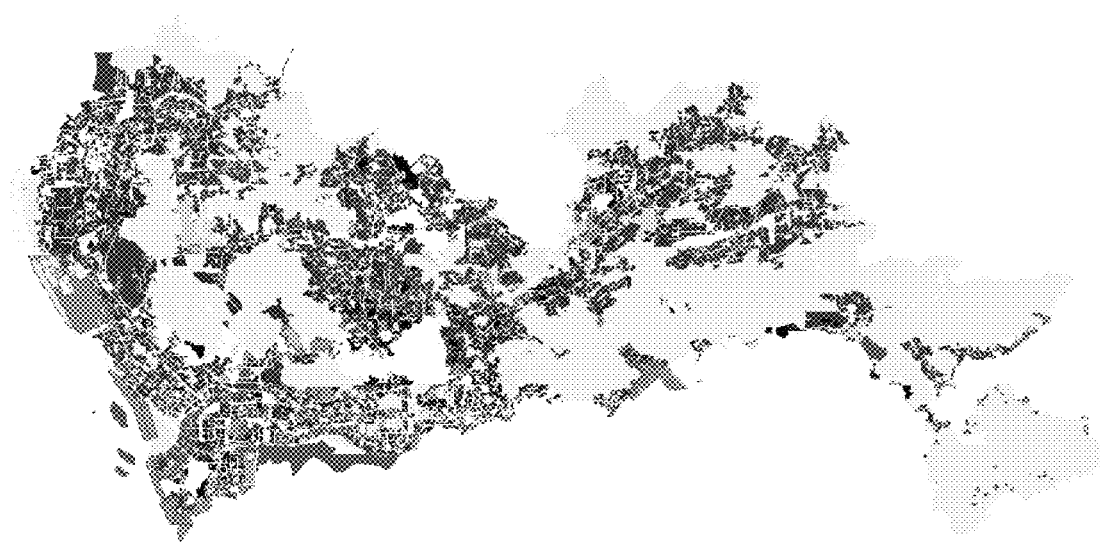
FIG. 5.1

FIG. 5.2

AUTOMATIC URBAN LAND IDENTIFICATION SYSTEM INTEGRATING BUSINESS BIG DATA WITH BUILDING FORM

CROSS-REFERENCE TO THE RELATED APPLICATIONS

This application is the national stage entry of International Application No. PCT/CN2020/071915, filed on Jan. 14, 2020, which is based upon and claims priority to Chinese Patent Application No. 201910072439.8, filed on Jan. 25, 2019, the entire contents of which are incorporated herein by reference.

TECHNICAL FIELD

The present invention pertains to the field of urban planning, and relates to an automatic urban land identification system, and in particular, to an automatic urban land identification system integrating business big data with building forms.

BACKGROUND

Urban land is a basis for planning and design of the urban planning discipline, and is a general term of land with a certain usage and function. With the rapid and stable development of urbanization, the city scale expands increasingly, and the layout of urban land becomes increasingly complicated, making it more difficult and time-consuming to survey usage of the urban land. In addition, the layout and scale of plots of urban land vary greatly with cities of different scales, and the differences in business features and building forms within the same type of land become more distinct. Identification of the usage of urban land is a basis for carrying out various types of urban planning and design. The current urban construction features, the spatial pattern, and land utilization can be analyzed based on the identification of urban land, thereby facilitating the assessment of the current construction status and the planning and design work.

Currently two urban land identification methods are commonly used. One method is performing surveying and mapping manually on site with reference to a current topographic map according to buildings, business, functions, and public space, etc. in the plots to obtain a comprehensive determining result. This identification method has the problems of long surveying and mapping time, consumption of a large quantity of manpower and material resources, and human judgment involved in land identification which is too subjective and is likely to cause incorrect judgment in case of construction of complicated plots. The second identification method is performing non-supervised cluster identification based on business points of interest (POIs). This identification method ignores the relevance between urban building forms and urban land, and the identification result has a large error coefficient due to insufficient data dimensions. As a result, this method can only coarsely identify the general category of land, but cannot precisely identify the subclass of urban land.

SUMMARY

Objective of the Invention: The present invention provides a system for automatically identifying an urban land by comprehensively extracting a data distribution feature of an urban business site and a multi-dimensional form feature of an urban spatial three-dimensional entity, so as to efficiently, automatically, and finely generate an urban land result for cities of different scales and provide a corresponding confidence degree.

Technical Solution: In order to achieve the objective, an automatic urban land identification system integrating business big data with building forms is provided in the present invention, the system including:

a data acquiring and inputting module configured to acquire and store spatial vector data and business site data within constructed regions of case cities of different scales and a target city, and input the spatial vector data and the business site data into a geographic information system, wherein the case cities of different scales are classified into five types according to a latest city scale division standard printed and issued by the State Council of the People's Republic of China: super mega city, mega city, large city, medium-sized city, and small city, one database and one machine learning classification model being correspondingly generated for each type of city, and the business site data comprises a business site name, geographic coordinates, and business feature type information, wherein the business feature type information is information about an industry to which a business site belongs, functional information of the business site, or classification information of the business site;

a database construction module configured to calibrate and associate data through the geographic information system according to a set automatic spatial calibration method to obtain a plot database associated with the business site, weight, according to business feature importance, the plot database associated with the business site, automatically calculate indicators of a maximum height, an average height, an average base area, and a floor area ratio of all buildings in each plot according to set building form feature indicators, associate the indicators with the plot, and generate and store a plot database comprising weighted business features and form features, the plot database comprising a database of the target city and databases of the case cities of different scales;

a machine learning training module configured to input land usage standard data of the case cities of different scales, the land usage standard data being classified according to land subclasses and being used as machine learning labels; and perform, by using a supervised classification learning algorithm, machine learning training on the databases of the case cities of different scales comprising weighted business features and form features and obtained by the database construction module, to generate a plurality of machine learning classification models corresponding to different city scales, and combine the models to form an automatic urban land identification model cluster;

an automatic identification module configured to automatically identify, by using the trained automatic urban land identification model cluster, urban land usage and a confidence degree corresponding to each plot in the constructed region of the target city according to the database of the target city comprising weighted business features and form features and generated in the database construction module; and a data outputting module configured to input, into a plot vector file, land usages according to subclasses corresponding to different color blocks, and annotate data confidence degrees to obtain a current urban land usage map.

Further, the spatial vector data within the urban constructed region comprises a polygonal block with a closed outline, wherein the block comprises more than one polygonal plot with a closed outline, the plot comprising more than one polygonal building with a closed outline, the building having information about the number of floors or a height.

Further, the automatic spatial calibration method comprises: spatially calibrating a business site and an urban block, spatially calibrating the business site and a land plot, associating the business site with attributes of the land plot and the urban block at which the business site is located, and first performing expansion on the urban plot and then spatially joining business site data.

Further, the geographic information system is configured to process vector data and comprising: ArcGIS and CAD.

Further, the weighting the plot database associated with the business site is implemented in the following manner: processing the plot database associated with the business site by using a TF-IDF algorithm according to the following formula:

$$\frac{n_{i,j}}{\sum_K n_{i,j}} \cdot \log\frac{|D|}{\{j:t_i \in D_j\}}$$

wherein i is a plot number, j is a business feature number, $n_{i,j}$ is a frequency of a $j^{th}$ business feature of an $i^{th}$ plot, K is the number of dimensions of the business feature, $|D|$ is the total number of plots in a city, and $\{j:t_i \in D_j\}$ is the number of plots of which the frequency of the $j^{th}$ business feature is not 0.

Further preferably, the indicator of the maximum height of all the buildings within the plot is a maximum value of heights of all the buildings in each plot; the indicator of the average height of all the buildings within the plot is an average value of the heights of all the building in each plot; the indicator of the average base area of all the buildings within the plot is an average value of geometric areas of closed polylines of all the buildings in each plot; and the indicator of the floor area ratio of all the buildings within the plot is a ratio of a sum of products of geometric areas of closed polylines and the number of floors of each building in each plot to the geometric areas of the closed polylines of the plot.

Further preferably, in the supervised classification learning algorithm, the databases of the case cities of different scales comprising weighted business features and form features are invoked in the database construction module according to different city scales, and model training and parameter optimization are performed based on an actually measured land usage data set of a typical city according to the city scales.

Further preferably, the actually measured land usage data set is divided into a training set, a verification set, and a test set through proportional sampling, and a machine learning model with optimal classification performance and generalization performance is selected as a final model through cross verification, parameter optimization, and generalization inspection.

Further preferably, the automatic identification module is configured to acquire and input the spatial vector data and the business site data within the constructed region of the target city in the data acquiring and inputting module after a region of the target city is selected, select a corresponding machine learning model for classification according to a city scale by using the database of the target city comprising the business feature and the form feature and obtained by the database construction module, output a possible land usage class of each plot of the city, and provide a classification confidence degree of each plot.

Further preferably, the data outputting module is configured to acquire the land usage corresponding to each plot output by the automatic identification module, plots of same land usage are filled with the same color by using subclass land usage as precision, and display an urban land identification result of an identified region by using a current urban land usage map with colored blocks Beneficial Effects: The present invention has the following beneficial effects:

1. By integrating business site features with building form features, training is performed by using a supervised classification learning algorithm according to actual measured standard data of urban land usage, to maximally increase accuracy of system identification.

2. Business site data is weighted according to importance thereof to prevent businesses of different label types from having a too large difference in order of magnitude to lead to an identification error.

3. A plurality of building form feature indicators are introduced to compensate for limitations of the identification of urban land only through business sites and maximally approach a common method for manually identifying urban land.

4. Corresponding databases are constructed according to cities of different scales, and a plurality of machine learning classification models corresponding to different city scales are generated through training to reduce the identification error caused by different city scales and ensure that the automatic urban land identification system is applicable to the identification of land usage of cities of different scales.

5. The standard data of urban land usage in machine learning and land usage data identified by the system are precise to a land usage subclass, ensuring the accuracy and practicability of the result automatic urban land identification.

6. The automatic urban land identification solves the problems in conventional on-site manual surveying and mapping of long surveying and mapping time, consumption of a large quantity of manpower and material resources, and human judgment involved in land identification which is too subjective and is likely to cause incorrect judgment in case of construction of complicated plots, achieves efficient, fully automatic, intelligent, and precise identification of the usage of urban land of different scales, providing an efficient and convenient surveying and mapping approach and reference for surveying and mapping of the current urban construction land, and effectively saving time costs of manual surveying and mapping.

BRIEF DESCRIPTION OF THE DRAWINGS

FIG. 4 is a diagram of hyper-parameter tuning of a GBDT model according to an embodiment of the present invention.

FIG. 5.1 is a map of current urban land usage according to an embodiment of the present invention. FIG. 5.2 is a partial enlarged map of FIG. 5.1.

DETAILED DESCRIPTION OF THE EMBODIMENTS

The technical solutions of the present invention are further described in detail below with reference to the accompanying drawings and embodiments.

Figure 1:
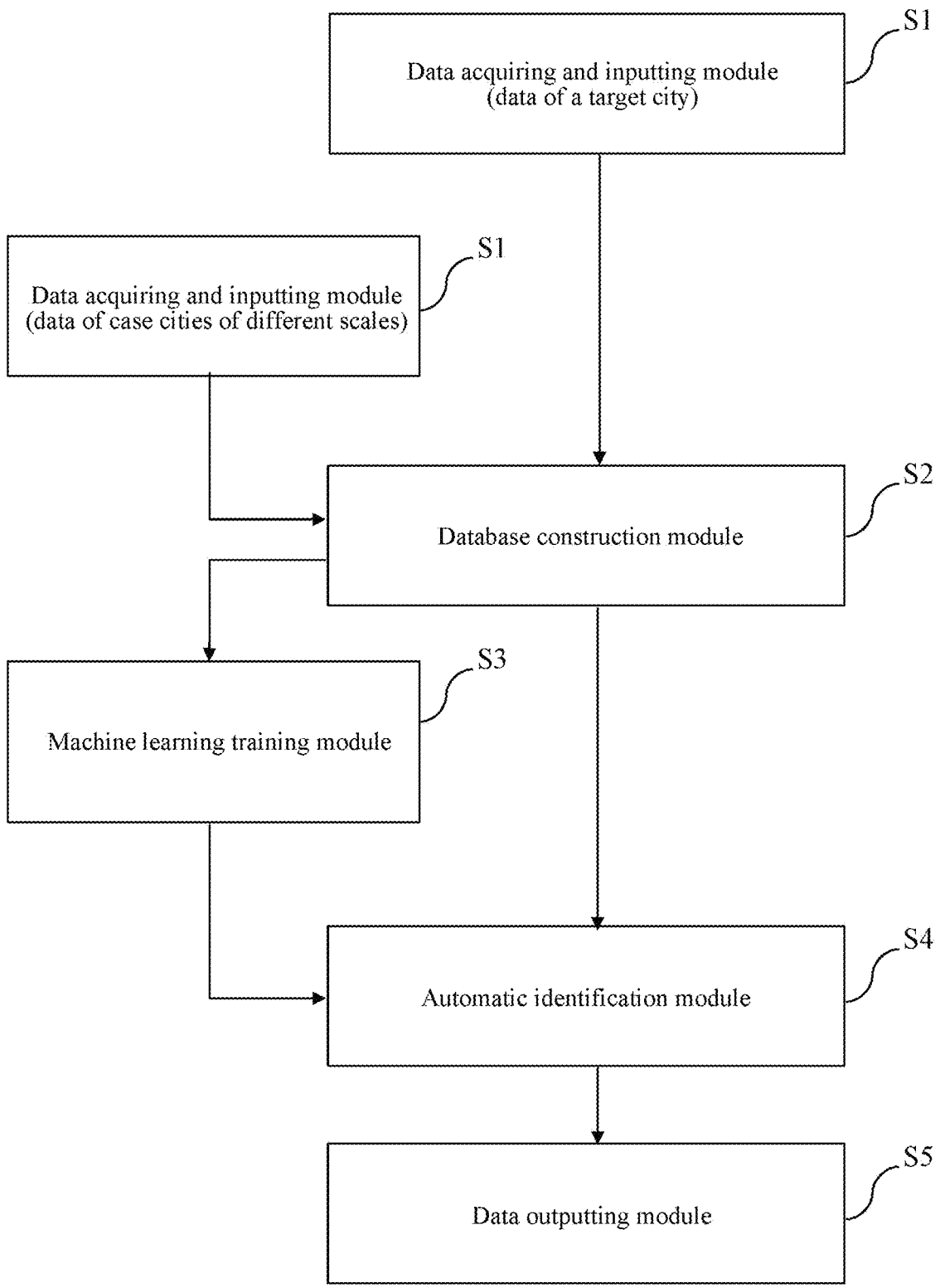
FIG. 1 is a flowchart of a method according to an embodiment of the present invention.

As shown in FIG. 1, an embodiment of the present invention discloses an automatic urban land identification system integrating business big data with building forms, the system including: a data acquiring and inputting module, a database construction module, a machine learning training module, an automatic identification module, and a data outputting module.

The data acquiring and inputting module is configured to acquire and store spatial vector data and business site data within constructed regions of case cities of different scales and a target city, and input the spatial vector data and the business site data into a spatial vector platform.

The case cities of different scales are classified into five types according to a latest city scale division standard printed and issued by the State Council of the People's Republic of China: super mega city, mega city, large city, medium-sized city, and small city, one database and one machine learning classification model being correspondingly generated for each type of city.

The spatial vector data and the business site data may also be obtained from a government department or a data provider in other related fields, or may be processed through geographic information system processing software or image data software and processed and acquired through software code programming. The spatial vector data usually includes vector data of polygonal block with a closed outline of a city (being generated through enclosure of a red line of a road), and vector data of a polygonal plot with a closed outline (usually provided by the government department, or generated through division of the block through a branch inside the block or a community road, etc., vector data of a polygonal building with a closed outline, and height/floor number information of each closed building (when the height is unknown, a building height is calculated based on the number of floors of the building, building height=the number of floors of the buildings*3 meters), and the foregoing data may be in a DWG format or an SHP format, etc. The business site data usually includes geographic coordinate business site data (data coordinates may be converted through projection in ArcGIS, including switching between projection coordinates and geographic coordinates, and conversion between different coordinate systems), a name of the business site, business feature type information (the business feature type information is information about an industry to which the business site belongs or functional information of the business site or classification information of the business site), and the foregoing data may be in an XLS format, a CSV format, a DWG format or an SHP format.

The spatial vector platform is configured to process vector data and includes: ArcGIS and CAD.

The database construction module is configured to construct a plot database including weighted business features and form features through association of spatial automatic calibration and calculation of building form feature indicators. The plot database includes a database of a target city and databases of case cities of different scales.

Association of the spatial automatic calibration refers to that automatic spatial association and correction between a plot and a business site are performed by using an expansion method and a spatial join method in consideration of inevitable drift and a precision loss of data coordinates. It should be noted that business site coordinates are inevitably drifted, that is, there is an error and misplace of several meters with a real spatial position. Meanwhile, a precision loss also exists in GPS coordinates due to precision of a floating-point number. The expansion method refers to enlargement and extension of a boundary of each block at a certain scale, so that each block may include business sites therein and nearby, providing a higher tolerance for a drift error and the precision loss. The spatial join method refers to regarding a plot layer and a business site layer as two superimposed layers, and establishing a spatial join index if a spatial inclusion relation exists. The foregoing methods may be implemented through a tool in ArcGIS, or may also be implemented through geopandas software package programming.

After the expansion and spatial join are completed, a block attribute table of an associated business site may be obtained through statistics of a frequency of a business feature within the plot, and a plot database of the associated business site is generated. Next, business features in the database need to be weighted according to importance thereof, and building form feature indicators are added.

Generally, weighting of the business site feature is mainly implemented by using a TF-IDF algorithm. In a TF method, business feature data is normalized through a ratio of a frequency of a business feature in a plot to a frequency of the business feature in an entire city. In an IDF method, importance of the business feature is measured through a logarithm value of a ratio of the total number of plots in the city to the number of plots including the business feature. The TF-IDF algorithm is shown in the following formula:

$$\frac{n_{i,j}}{\sum_K n_{i,j}} \cdot \log \frac{|D|}{\{j : t_i \in D_j\}},$$

where i is a plot number, j is a business feature number, $n_{i,j}$ is a frequency of a $j^{th}$ business feature of an $i^{th}$ plot, K is the number of dimensions of the business feature, $|D|$ is the total number of plots in a city, and $\{j : t_i \in D_j\}$ is the number of plots of which the frequency of the $j^{th}$ business feature is not 0.

Data of a building form indicator of each plot is automatically calculated according to set building form feature indicators, a plot attribute table including weighted business features and form features is generated, and a plot database including the weighted business features and the form features is generated and stored. The building form indicator includes an indicator of a maximum height, an indicator of an average height, an indicator of an average base area, and an indicator of a floor area ratio of all buildings in the plot. An area of each plot and a base area of each building (including an area of the polygonal outline) may be obtained through geometrical calculation of a polygonal space formed by closed polylines. The indicator of the maximum height is a maximum value of heights of all the buildings in the plot. The indicator of the average height is an average value of the heights of all the buildings in the plot. The indicator of the average base area is an average value of geometric areas of closed polylines of all the buildings in the plot. The indicator of the floor area ratio is a ratio of a sum of products of the geometric areas of the closed polylines and the number of floors of each building in the plot to the geometric areas of the closed polylines of the plot.

The machine learning training module is configured to use land usage standard data of cities of different scales as learning labels, perform, by using a supervised classification learning algorithm, machine learning training on databases of case cities of different scales including weighted business features and form features obtained by the database construction module, to generate a plurality of machine learning classification models corresponding to different city scales, and combine the models to form an automatic urban land identification model cluster.

Feature data of a typical city in the databases of case cities of different scales collected by the data acquiring and inputting module is obtained by invoking the database construction module, and the feature data is used as training data. Independent models are trained separately according to different city scales to be adapted to demands of identification of various cities. The training data is divided into a training set, a verification set, and a test set through proportional sampling. A weighted business feature and a building form feature of a plot is inputted to the model, and a possible land usage class of the plot is outputted. The label is provided by an actually measured land usage.

Common supervised classification learning algorithms include: logistic regression, a tree model, a support vector machine, and an integrated model, etc. Considering that the plot label is divided into a plurality of categories according to a subclass and feature dimensions of the plot are relatively high, the feature dimensions including both the weighted business feature dimension and the building form feature dimension of the plot, in order to improve classification accuracy of the model, it is recommended that an optimized integrated tree model is used for classification, such as a gradient boosting decision tree (GBDT) model, and an xgboost model, etc. During parameter optimization, according to the performance of the verification set, parameters such as the number of nodes, a maximum depth, and a learning rate, etc. are gradually adjusted, so that while the performance on the verification set is optimal under the same conditions, a K-fold cross-verification method is used for cross-verification to avoid over-fitting of the model.

The automatic identification module is configured to automatically identify, by using the trained automatic urban land identification model cluster, usage and a confidence degree of each plot according to the database of the target city including weighted business features and form features and generated in the database construction module.

The automatic identification module invokes a trained model cluster in the machine learning training module. The model cluster corresponds to various city scales. The automatic identification module only needs to set a parameter to determine a scale of a target city region, and then a corresponding classification model may be automatically invoked.

When the system needs to automatically identify land usage of the target city region, a corresponding classification model is first selected according to a city scale of the target city region, and a collected business feature and a building form feature of a plot of the target city is obtained by invoking a database, the features are input into the classification model as a feature vector, a possible land usage class of plots of the target city region is finally generated, and a classification confidence degree is provided.

The data outputting module is configured to input, into a plot vector file, land usages corresponding to different color blocks, annotate confidence degrees, and print a result in a drawing to obtain a current urban land usage map.

After the land usage of each plot is obtained, according to sub-class land usage, 8 big classes, 35 middle classes, and 42 sub-classes in urban construction land classification in the Standard for Urban Land Classification and Planning and Construction Land (GB50137-2011) are generally adopted. Alternatively, a city classification land standard of regions and cities may be used as precision, and plots of same land usage may be filled with the same color, and a confidence degree of each land identification result may be automatically annotated. A full-color inkjet printer is used to print and display the urban land identification result in an identified region as a flat vector image with a colored block.

The automatic urban land identification system integrating business big data with building forms according to the embodiments of the present invention can efficiently, automatically, and finely identify land usages of cities of different scales, and further generate an urban land identification result and provide a corresponding confidence degree, solving the problems of long time, consumption of much manpower, and high probability of incorrect judgment in conventional on-site manual surveying and mapping, providing an efficient and convenient surveying and mapping approach and reference for surveying and mapping of the current urban construction land, effectively saving time costs of manual surveying and mapping.

EXAMPLES

A technical solution of the present invention is described in detail below by taking automatic urban land identification in Shenzhen as an example.

(1) Shanghai (super mega city), Nanjing (mega city), Harbin (large city), Zhenjiang (medium-sized city), Zhangjiagang (small city) are used as five types of case cities of different scales, and Shenzhen is used as a target city. A data acquiring and inputting module is configured to respectively acquire spatial vector data and business site data in constructed regions of the cities, and the spatial vector data and the business site data are inputted into a spatial vector platform. Steps specifically include the following.

(1.1) Spatial vector data of the cities is obtained through a corresponding planning department of the cities, including a current closed block CAD file, a current closed land plot CAD file, and a current closed building and floor number CAD file of each city.

(1.2) The current closed block CAD file and the current closed land plot CAD file in the spatial vector data are imported into ArcGIS software, and an SHP format of closed polylines is exported; the current closed building and floor number CAD file is imported into ArcGIS software, and an SHP format of closed polylines of the building and an SHP format of a point of the number of floors are exported. Spatial join is performed on a closed surface of the building and the point of the number of floors of the building, and information about the number of floors is attached to each building.

(1.3) Coordinate data of a northwest corner and a southeast corner of a constructed region of each city is acquired through a Baidu coordinate picker, and an XLS file of business information within a corresponding region is obtained through Python programming.

(1.4) The XLS file of the business information is exported in a CSV format, an XY data is imported in ArcGIS software, and the file is exported in an SHP format to obtain the business site data including a name of a business site, geographic coordinates, and business feature type information.

(2) A database construction module numbers plot units of a city and performs spatial join and calibration on the business site, and obtains the number of the business sites of different features within each plot through statistics, to generate a plot database associated with the business site. Business site feature are weighted, and various types of building form data within the plot are calculated, to generate a plot feature attribute table including weighted business features and building form features, and generate a plot database including the weighted business features and the form features. Steps specifically include the following.

(2.1) Spatial units formed by the plots are numbered as i:1, 2, . . . , |D|, expansion is performed on each plot unit in space, that is, each plot unit is expanded outward by several meters from a plot boundary.

Figure 2:
FIG. 2 is a map of spatial join between business sites and plots according to an embodiment of the present invention.

(2.2) As shown in FIG. 2, spatial join is performed on a business site layer and an expanded plot unit layer, the number of k types of business sites of spatial units of each plot is obtained through statistics, that is, a frequency of a business feature of each plot, and the plot attribute table and the plot database associated with the business site are generated. Business feature numbers 1, 2, •, j, •, 20 are used in the system. The business features are shown in Table 1:

TF-IDF algorithm is specifically shown in the following formula:

$$\frac{n_{i,j}}{\sum_K n_{i,j}} \cdot \log \frac{|D|}{\{j:t_i \in D_j\}},$$

where i is a plot number, j is a business feature number, $n_{i,j}$ is a frequency of a $j^{th}$ business feature of an $i^{th}$ plot, K is the number of dimensions of the business feature, |D| is the total number of plots in a city, and $\{j:t_i \in D_j\}$ is the number of plots of which the frequency of the $j^{th}$ business feature is not 0.

Through such calculation, the business features can be re-weighted according to the numbers of occurrence times and importance thereof to obtain the plot feature attribute table including weighted business features.

(2.4) Spatial join is performed on a building layer (including information about the number of floors and a polygonal building with a closed outline) and a plot unit layer, four building form indicators of each plot are calculated and added to the plot feature attribute table including the weighted business feature, and the plot attribute table and the plot database including the weighted business feature and the building form feature are generated and stored. The building form feature indicators are shown in Table 2:

TABLE 2

Building Form Feature Indicator Table

| Indicator code | Indicator name | Description of indicator | Algorithm of the indicator |
| --- | --- | --- | --- |
| $H_{max}$ | Indicator of a maximum height | A maximum value of heights (the number of floors * 3 m) of all buildings within a plot | $H_{max} = MAX(F_1 * 3, F_n * 3)$ |
| $H_{ave}$ | Indicator of an average height | An average value of the heights (the number of floors * 3 m) of all the buildings within the plot | $H_{ave} = MEAN(F_1 * 3, F_n * 3)$ |
| $S_{ave}$ | Indicator of an average base area of the building | An average value of geometric areas of the closed polylines of all the buildings within the plot | $S_{ave} = MEAN(A_1, A_n)$ |
| FAR | Indicator of a floor area ratio | a ratio of a sum of products of the geometric areas of the closed polylines and the number of floors of each building in the plot to the geometric areas of the closed polylines of the plot | $FAR = \Sigma_{i=0}^{n} A_i F_i / B$ |

TABLE 1

Business Feature Classification Table

| Company | Shopping | Food | Exit and entrance | Real estate |
| --- | --- | --- | --- | --- |
| Life service | Road | Transportation facilities | Beautification | Government agency |
| Automobile service | Medical care | Finance | Leisure and entertainment | Hotel |
| Exercise and fitness | Educational training | Scenic spot | Cultural medium | Natural ground feature |

(2.3) The completed plot database associated with the business site is processed by using a TF-IDF algorithm. The $H_{max}$ is the indicator of the maximum height of the plot, $H_{ave}$ is the indicator of the average height of the plot, $S_{ave}$ is the indicator of the average base area of the building, FAR is the indicator of the floor area ratio, A is the base area of the building, F is the number of floors of the building, B is the area of the plot, and n is the total number of buildings in the plot.

(3) A machine learning training module is configured to acquire data of five cities including Shanghai, Nanjing, Harbin, Zhenjiang, and Zhangjiagang from the data acquiring and inputting module, perform sampling and division on a data set, and perform model selection and training, and obtain a final model through parameter optimization and cross verification, and combine a plurality models obtained by training of data of cities of different scales into a model cluster.

Shenzhen representing the mega cities is used as an example below. (3) specifically includes the following:

(3.1) The machine learning training module extracts plot data of a typical city including the business feature, the building form feature, and a land usage label from the data constructing module, each typical city representing a city scale.

Figure 3:
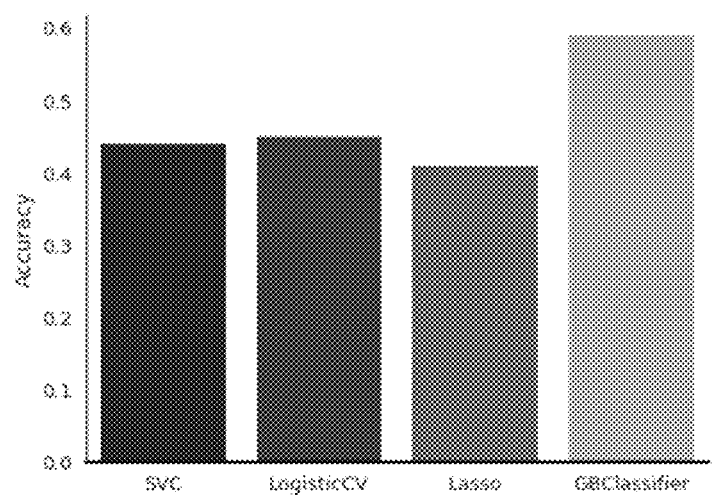
FIG. 3 is a comparison chart of performance of machine learning models according to an embodiment of the present invention.

(3.2) Equal proportional sampling is performed on the plot feature attribute table to divide the table into a training set, a verification set, and a test set in a proportion of 6:2:2, model training is performed by using models such as GBDT, SVM, and LASSO, and an appropriate model is determined according to classification accuracy. Comparison of model performance is shown in FIG. 3. After a selected model is determined, parameters of the model are optimized. A maximum depth max_depth of a GBDT algorithm is used as an example. As shown in FIG. 4, an appropriate model hyper-parameter is selected to further optimize classification performance.

(3.3) A final model cluster adapted to various city scales is obtained after model training is performed on cities of various city scales, and model training is completed.

(4) An automatic identification model automatically identifies land usage of Shenzhen, a target city region, acquires the business feature and the building form feature from a database of the target city including the business feature and the building form feature and generated in the database construction module, determines a city scale according to population of the city, selects a land usage model of Shanghai that is a same super mega city from the model cluster, inputs plot data of Shenzhen, generates and outputs a possible land usage class table of plots of Shenzhen, and provides a classification confidence degree.

(5) A data outputting module is configured to input, into a plot vector file, outputted land usages of the target city corresponding to different color blocks, annotate confidence degrees, and print a result in a drawing to obtain an urban land usage map, specifically including:

(5.1) 8 big classes, 35 middle classes, and 42 sub-classes in urban construction land classification in the Standard for Urban Land Classification and Planning and Construction Land (GB50137-2011) are generally adopted according to subclass land usage. Alternatively, a city classification land standard of regions and cities may be used as precision, and plots of same land usage may be filled with the same color, and a confidence degree of each land identification result may be automatically annotated.

(5.2) A full-color inkjet printer is used to print and display the urban land identification result in an identified region as a flat vector image with a colored block. As shown in FIG. 5.1, FIG. 5.2 is a partial enlarged map.

What is claimed is:

1. An automatic urban land identification system integrating business big data with building forms, the automatic urban land identification system comprising:
a data acquiring and inputting module configured to acquire and store spatial vector data and business site data within a plurality of constructed regions of a plurality of case cities of a plurality of different scales and a target city, and input the spatial vector data and the business site data into a geographic information system, wherein the plurality of case cities of the plurality of different scales are classified into five types: a super mega city, a mega city, a large city, a medium-sized city, and a small city, one database and one machine learning classification model being correspondingly generated for each type of city, and the business site data comprises a business site name, a plurality of geographic coordinates, and business feature type information, wherein the business feature type information is information about an industry, wherein a business site belongs to the industry, functional information of the business site, or classification information of the business site;
a database construction module configured to calibrate and associate data through the geographic information system according to a set automatic spatial calibration method to obtain a plot database associated with the business site, a weight, according to a business feature importance, the plot database associated with the business site, automatically calculate a plurality of indicators of a maximum height, an average height, an average base area, and a floor area ratio of all buildings in each plot according to a plurality of set building form feature indicators, associate the plurality of indicators with the each plot, and generate and store the plot database comprising a plurality of weighted business features and a plurality of form features, the plot database comprising a database of the target city and a plurality of databases of the plurality of case cities of the plurality of different scales;
a machine learning training module configured to input land usage standard data of the plurality of case cities of the plurality of different scales, the land usage standard data being classified according to a plurality of land subclasses and being used as a plurality of machine learning labels; and perform, by using a supervised classification learning algorithm, a machine learning training on the plurality of databases of the plurality of case cities of the plurality of different scales comprising the plurality of weighted business features and the plurality of form features and obtained by the database construction module, to generate a plurality of machine learning classification models corresponding to a plurality of different city scales, and combine the plurality of machine learning classification models to form an automatic urban land identification model cluster;
an automatic identification module configured to automatically identify, by using a trained automatic urban land identification model cluster, an urban land usage and a confidence degree corresponding to the each plot in a constructed region of the plurality of constructed regions of the target city according to the database of the target city comprising the plurality of weighted business features and the plurality of form features and generated in the database construction module; and
a data outputting module configured to input, into a plot vector file, a plurality of land usages according to the plurality of land subclasses corresponding to a plurality of different color blocks, and annotate a plurality of data confidence degrees to obtain a current urban land usage map.

2. The automatic urban land identification system integrating business big data with building forms according to claim 1, wherein the spatial vector data within an urban constructed region comprises a polygonal block with a closed outline, wherein the polygonal block comprises more than one polygonal plot with the closed outline, the each plot comprising more than one polygonal building with the closed outline, a building having information about a number of floors or a height.

3. The automatic urban land identification system integrating business big data with building forms according to claim 1, wherein the set automatic spatial calibration method comprises: spatially calibrating the business site and an urban block, spatially calibrating the business site and a land plot, associating the business site with a plurality of attributes of the land plot and the urban block, wherein the business site is located at the urban block, and first performing an expansion on the urban plot and then spatially joining the business site data.

4. The automatic urban land identification system integrating business big data with building forms according to claim 1, wherein the geographic information system is configured to process the spatial vector data and comprising: Aeronautical reconnaissance coverage Geographic Information System (ArcGIS) and Computer Aided Design (CAD).

5. The automatic urban land identification system integrating business big data with building forms according to claim 1, wherein weighting the plot database associated with the business site is implemented in the following manner:

processing the plot database associated with the business site by using a TF-IDF algorithm according to the following formula:

$$\frac{n_{i,j}}{\sum_K n_{i,j}} \cdot \log \frac{|D|}{\{j:t_i \in D_j\}}$$

wherein i is a plot number, j is a business feature number, $n_{i,j}$ is a frequency of a $j^{th}$ business feature of an $i^{th}$ plot, K is a number of dimensions of the business feature, |D| is a total number of plots in a city, and $\{j:t_i \in D_j\}$ is a number of plots of the city wherein the frequency of the $j^{th}$ business feature is not 0.

6. The automatic urban land identification system integrating business big data with building forms according to claim 1, wherein the indicator of the plurality of indicators of the maximum height of all the buildings within the each plot is a maximum value of heights of all the buildings in the each plot; the indicator of the plurality of indicators of the average height of all the buildings within the each plot is an average value of the heights of all the building in the each plot; the indicator of the plurality of indicators of the average base area of all the buildings within the each plot is an average value of a plurality of geometric areas of a plurality of closed polylines of all the buildings in the each plot; and the indicator of the plurality of indicators of the floor area ratio of all the buildings within the each plot is a ratio of a sum of products of plurality of geometric areas of plurality of closed polylines and the number of the floors of each building of all the buildings in the each plot to the plurality of geometric areas of the plurality of closed polylines of the each plot.

7. The automatic urban land identification system integrating business big data with building forms according to claim 1, wherein in the supervised classification learning algorithm, the plurality of databases of the plurality of case cities of plurality of different scales comprising the plurality of weighted business features and plurality of form features are invoked in the database construction module according to the plurality of different city scales, and a model training and a parameter optimization are performed based on an actually measured land usage data set of a typical city according to the plurality of city scales.

8. The automatic urban land identification system integrating business big data with building forms according to claim 6, wherein the actually measured land usage data set is divided into a training set, a verification set, and a test set through a proportional sampling, and a machine learning model with an optimal classification performance and generalization performance is selected as a final model through a cross verification, a parameter optimization, and a generalization inspection.

9. The automatic urban land identification system integrating business big data with building forms according to claim 1, wherein the automatic identification module is configured to acquire and input the spatial vector data and the business site data within the constructed region of the plurality of constructed regions of the target city in the data acquiring and inputting module after a region of the target city is selected, select a corresponding machine learning model for a classification according to a city scale by using the database of the target city comprising the business feature of the plurality of business features and the form feature of the plurality of form features and obtained by the database construction module, output a possible land usage class of the each plot of the target city, and provide a classification confidence degree of the each plot.

10. The automatic urban land identification system integrating business big data with building forms according to claim 1, wherein the data outputting module is configured to acquire the land usage corresponding to each plot output by the automatic identification module, plots of a same land usage are filled with a same color by using a subclass land usage as precision, and display an urban land identification result of an identified region by using a current urban land usage map with a plurality of colored blocks.

* * * * *